A. E. TATRO.
PIPE FITTING.
APPLICATION FILED MAY 19, 1919.

1,352,102.

Patented Sept. 7, 1920.

Inventor:
Adelor E. Tatro.
By his attorney.
Charles N. Gooding.

UNITED STATES PATENT OFFICE.

ADELOR E. TATRO, OF EVERETT, MASSACHUSETTS.

PIPE-FITTING.

1,352,102.  Specification of Letters Patent.  Patented Sept. 7, 1920.

Application filed May 19, 1919. Serial No. 298,193.

*To all whom it may concern:*

Be it known that I, ADELOR E. TATRO, a citizen of the United States, residing at Everett, in the county of Middlesex and State of Massachusets, have invented new and useful Improvements in Pipe-Fittings, of which the following is a specification.

This invention relates to pipe fittings for obtaining a variety of angles and thereby altering the course of pipe lines during their installation.

The object of the invention is to provide a novel construction of elbow which can be adapted to different angles thereby eliminating the necessity of providing a large variety of elbows of different angles or of using a plurality of similar elbows in order that the desired course may be given to the line of pipe which is being installed to the end that said line of pipe may be erected with a smaller number of parts and a smaller number of turns and joints, thereby decreasing the cost of the installation.

It is still further the object of the invention to so construct the pipe fitting that said fitting may perform the functions of an elbow and also an offset union.

The invention consists in the combination and arrangement of parts set forth in the following specification and particularly pointed out in the claims thereof.

Referring to the drawings.

Like numerals refer to like parts throughout the several views of the drawings.

Figure 1:
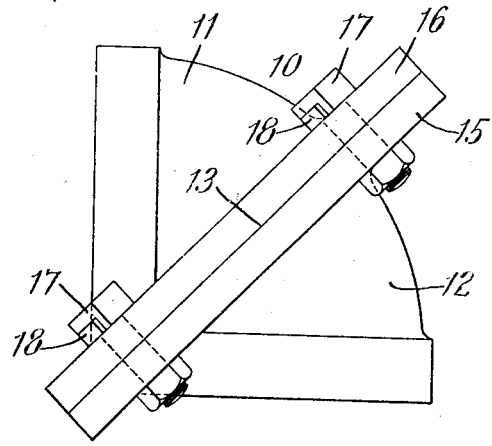
Figure 1 represents a side elevation of my improved pipe fitting, said fitting as illustrated constituting an elbow.
Figure 2:
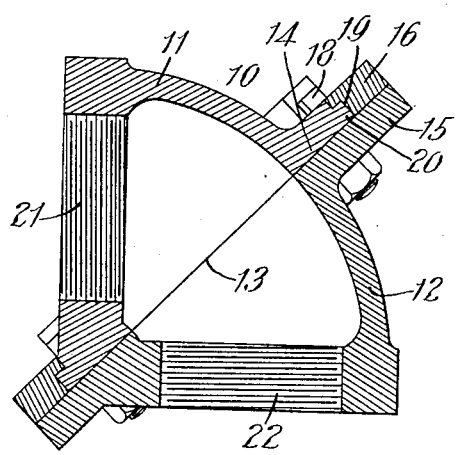
Fig. 2 is a transverse sectional view of the same.
Figure 3:
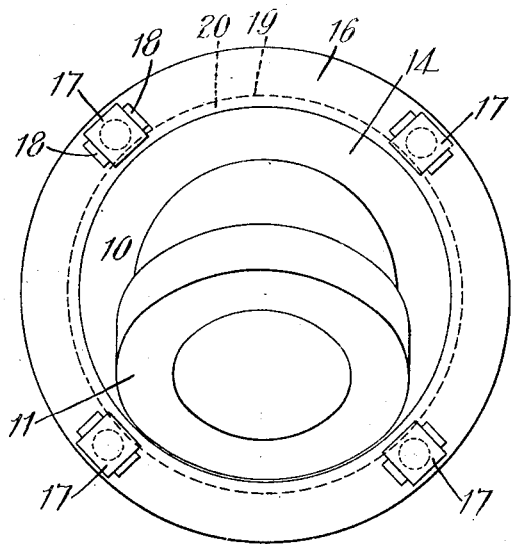
Fig. 3 is an elevation as viewed from the direction of the arrow *a* in Fig. 1.

In the drawings, referring particularly to Figs. 1, 2 and 3, 10 represents an elbow comprising two members 11 and 12 divided transversely of said elbow upon a line 13 in a plane at 45° to the end faces of said elbow. The member 11 has an annular flange 14, while the member 12 has an annular flange 15, each of said flanges being disposed adjacent to each other. An annular ring 16 is secured to the flange 15 by means of a plurality of bolts 17, the said annular ring 16 being preferably of the same diameter as the flange 15 and the same thickness as each of the flanges 14 and 15. Lugs 18 on the ring 16 engage opposite sides of the heads of the bolts 17 and prevent said bolts from turning as said bolts are being tightened or loosened. The annular ring 16 is provided with an annular recess 19 adapted to receive an annular shouldered portion 20 provided on the flange 14. The member 11 thus mounted upon the member 12 may be rotated as desired and said members may assume all the different angles relatively to each other, possible between the position illustrated in Fig. 1 and the position illustrated in Fig. 4. Each of the members 11 and 12 may be screw-threaded as illustrated at 21 and 22 to receive sections of pipe provided with screw-threaded ends, or said members may be adapted to be used as flanged fittings without departing from the spirit of this invention.

Figure 4:
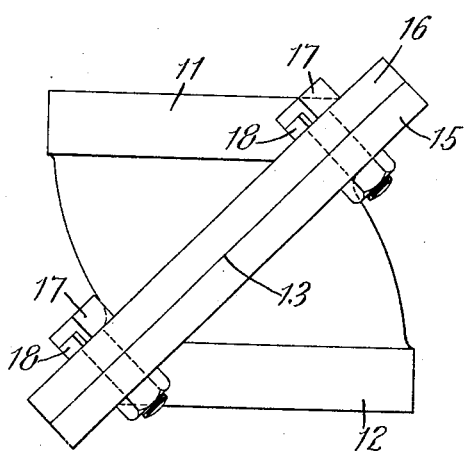
Fig. 4 is a side elevation illustrating one of the positions to which my improved pipe fitting is capable of being adapted, the said fitting as illustrated constituting a union.

In Fig. 4 the pipe fitting performs the functions of a union, the pipes entering said union would be slightly offset. If necessary, gaskets may be used to render the fitting tight.

The operation of my improved pipe fitting is as follows:

In installing a line of pipe, if a 90° elbow is required, the fitting may be used as illustrated in Fig. 1. If, however, elbows of other angles are required within the range of the possibilities of the fitting, the bolts 17 may be loosened and either of the members 11 or 12 may be rotated relatively to the other until the desired angle is obtained. The bolts 17 are then tightened and the members 11 and 12 are thereby fastened securely together. A line of pipe may thus be installed without the necessity of a large variety of elbows of different angles and in many instances one pipe fitting embodying my invention will accomplish what has formerly required several. In this manner the cost of the material used is reduced and also the amount of labor required in assembling the fittings is also reduced.

The fittings may also be used to advantage in repair work, where in replacing a broken elbow of the ordinary type, it has been the custom to also cut away a section of each of the pipes entering the same. A new elbow is then provided in which short sections of pipe are screwed, and these short sections of pipe are fastened to the main pipe by the ordinary flange unions. This operation all necessitates quite an amount of labor. With my improved fitting it is only necessary to remove the broken elbow and fasten to each end of pipe the members 11 and 12, and then fasten the same together in the usual manner by means of the bolts 17.

Figure 5:
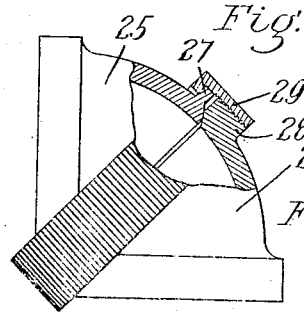
Fig. 5 is a side elevation partly broken away and shown in section illustrating a modified method of constructing a pipe fitting embodying my invention.

In Fig. 5, I have illustrated a modified construction of pipe fitting embodying my invention. This fitting consists of two members 25 and 26. The member 25 is provided with an annular flange 27 and the member 26 is also provided with an annular flange 28. An annular ring 29 has screw-threaded engagement with the periphery of the flange 28 and is constructed and arranged to engage the flange 27 of the member 25 and securely fasten said member 25 to the member 26. A slight turning of the annular ring 29 in the desired direction will allow the members 25 and 26 to be rotated relatively to each other or be securely fastened to each other. The pipe fitting illustrated in Fig. 5 is capable of assuming all of the angles and performing all the functions of the pipe fitting illustrated in Figs. 1 to 4 inclusive.

Having thus described my invention, what I claim and desire to secure by Letters Patent is:

1. A pipe fitting comprising an elbow divided transversely thereof into two members, an annular flange on each of said members, and an annular ring provided with an annular recess fast to the face of one of said annular flanges, the other of said annular flanges projecting into said annular recess whereby said members may be rotated from 0° to 90° to assume different angles relatively to each other and may also be fastened together.

2. A pipe fitting comprising an elbow divided into two members transversely thereof, an annular flange on each of said members, one of said flanges being of greater diameter than the other of said flanges, an annular ring provided with a recess within which the smaller of said flanges is adapted to rotate and means to fasten said ring to the face of the larger of said flanges and thereby fasten said members together.

3. A pipe fitting comprising an elbow divided into two members transversely thereof, an annular flange on each of said members, one of said flanges being of greater diameter than the other of said flanges, and an annular ring fast to the face of the larger of said flanges and provided with an annular recess therein adapted to receive the smaller of said flanges and thereby fasten said members together, the said ring coöperating with the smaller flange to constitute an extension thereof.

In testimony whereof I have hereunto set my hand in presence of two subscribing witnesses.

ADELOR E. TATRO.

Witnesses:
FRANKLIN E. LOW,
HERMAN R. HOFFMAN.